United States Patent [19]

Holzhacker

[11] 4,250,751
[45] Feb. 17, 1981

[54] HEAD FOR AN ELECTRONIC THERMOMETER

[76] Inventor: Albert Holzhacker, Joao Felipe Silva St., No. 192, Jardim Petropolis, Sao Paulo SP, Brazil

[21] Appl. No.: 55,455

[22] Filed: Jul. 6, 1979

[51] Int. Cl.³ .......................... G01K 1/14; G01K 1/16
[52] U.S. Cl. .............................. 73/362.8; 73/359 R; 73/362 AR; 136/230
[58] Field of Search ............ 73/362.8, 362.3, 362 AR; 338/28; 136/230, 231

[56] References Cited

U.S. PATENT DOCUMENTS

| | | | |
|---|---|---|---|
| 1,422,672 | 7/1922 | Coglan | 136/231 |
| 2,195,019 | 3/1940 | Bloomheart | 73/362 AR |
| 2,293,276 | 8/1942 | Brown et al. | 73/362.8 X |
| 2,579,271 | 12/1951 | Polye | 73/362 AR X |
| 2,818,482 | 12/1957 | Bennett | 73/362 AR X |
| 3,143,439 | 8/1964 | Hansen | 73/359 R X |
| 3,217,543 | 11/1965 | Van Haagen | 73/359 R |
| 3,303,057 | 2/1967 | Winckler et al. | 136/230 X |
| 3,377,208 | 4/1968 | Webb | 136/230 |
| 3,377,862 | 4/1968 | Gheorghia | 73/362 AR |
| 3,477,292 | 11/1969 | Thornton | 73/362 AR |
| 3,940,988 | 3/1976 | Reed | 136/231 X |
| 4,020,443 | 4/1977 | Le Roy et al. | 73/362.8 X |

Primary Examiner—Daniel M. Yasich
Attorney, Agent, or Firm—Steinberg & Raskin

[57] ABSTRACT

A test head for an electronic thermometer includes a thin rod having a substantially flat end portion defined by opposed sides, a heat-conductive element associated with the end portion which is extremely exposed at least at one of the end portion sides and a temperature sensor member at least partially embedded in the heat-conductive element. The thin rod is adapted to be connected to an electronic temperature indicating circuit.

10 Claims, 5 Drawing Figures

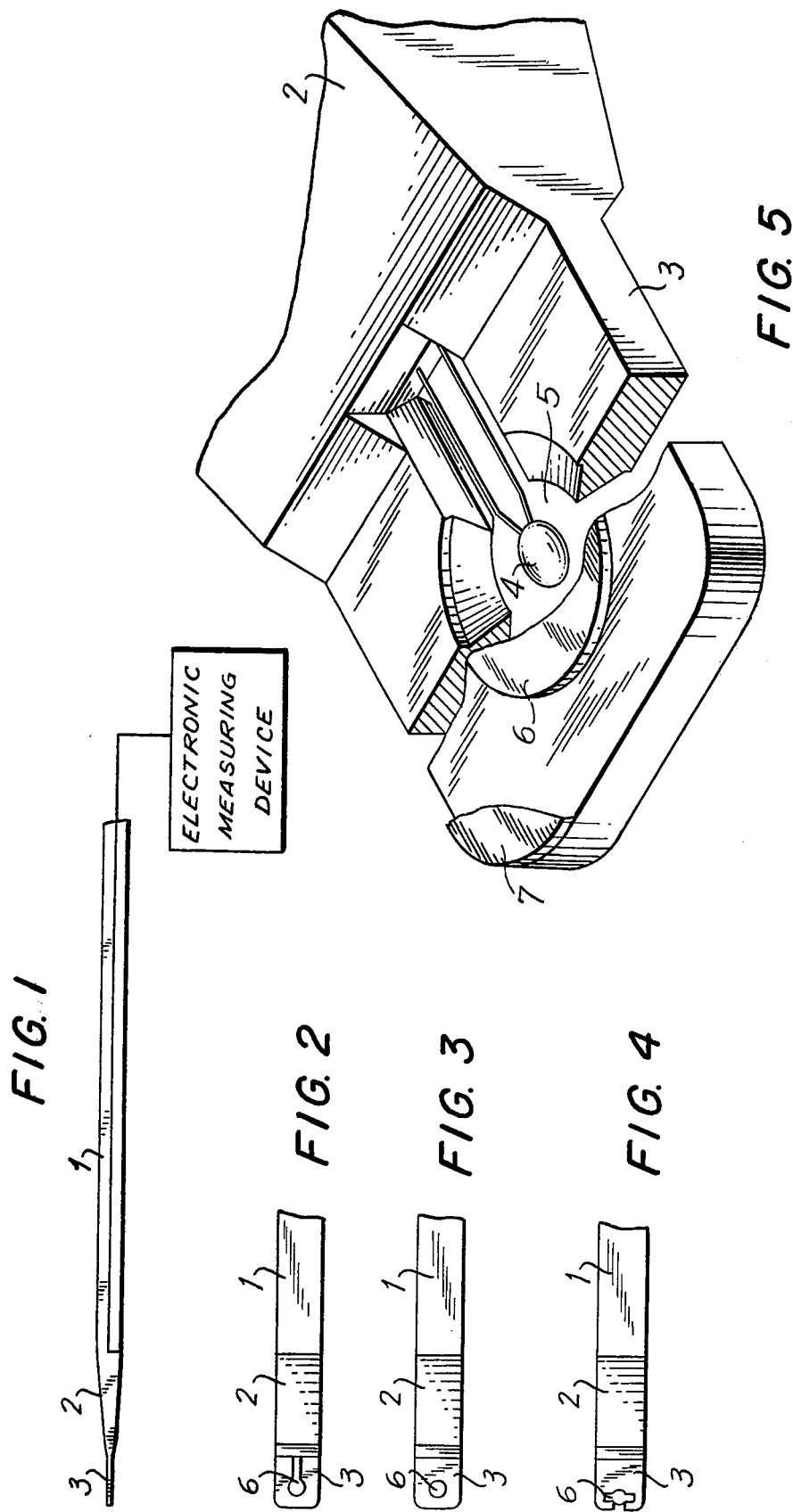

HEAD FOR AN ELECTRONIC THERMOMETER

BACKGROUND OF THE INVENTION

The present invention relates to a head for use with an electronic thermometer which itself is adapted both for general use and for clinical use.

Mercury thermometers are widely utilized as temperature measuring devices. These thermometers, however, are not entirely satisfactory in that they provide neither a rapid nor a very precise reading. They are further disadvantageous in that their use presents a danger of re-infecting the patient, and additionally, they are easily broken during use. In other words, such devices lack the necessary structural integrity for reliable operation.

Electronic thermometers are also known which include sensor probes, usually in the form of tubes constructed of stainless steel or other suitable materials and which incorporate sensor elements (usually thermistors). These electronic thermometers generally must contact the body whose temperature is to be measured substantially at right angles. For this reason, it is difficult to use such devices to obtain the temperature in hard to reach areas, such as the armpits or on the body surfaces, then requiring a sublingual or rectal placing. Furthermore, these thermometers require a rather high time interval to reach a steady-state reading, i.e., some time is required to accurately obtain the patient's body temperature. This is especially true when the electronic devices are used with disposable covers. For these reasons, these thermometers require assistance of additional electronic circuits to compensate for the delay, which additional equipment involves considerable additional cost.

SUMMARY OF THE INVENTION

Accordingly, it is an object of the present invention to provide a head for an electronic thermometer which avoids the above-enumerated disadvantages of the prior art.

More particularly, it is an object of the present invention to provide a head for an electronic thermometer in which accurate temperature reading is obtained in a time which is considerably shorter than that required in the known thermometers.

Another object of the present invention is to provide a head for an electronic thermometer, which is easily placed in thermal contact with any part of the user's body.

Briefly, in accordance with the present invention, these and other objects are obtained by providing a head for an electronic thermometer including a substantially thin rod electrically connectable with an electronic temperature indicating circuit. The rod has a substantially flat end portion defined by two opposed sides, a heat-conductive element associated with the end portion of the rod and which is externally exposed at least at one of the end portion sides and a temperature sensor member at least partially embedded in the heat-conductive element.

When the head of an electronic thermometer is designed in accordance with the present invention, it provides ready thermal contact with any part of the user's body and further provides for an accurate temperature reading in a time which is considerably shorter than that required by the known thermometers.

BRIEF DESCRIPTION OF THE DRAWINGS

A more complete appreciation of the invention and many of the attendant advantages thereof will be readily appreciated as the same becomes better understood by reference to the following description when considered in connection with the accompanying drawings in which:

FIG. 1 is a side view of a head of an electronic thermometer in accordance with the present invention;

FIGS. 2, 3 and 4 illustrate the head of FIG. 1 with three respective types of openings in an end portion of the head in which a heat-conductive element and a sensor member are provided; and FIG. 5 is an enlarged view of the end portion of the head of an electronic thermometer, with a vertical cut.

DESCRIPTION OF PREFERRED EMBODIMENTS

Referring now to the drawings wherein like reference numerals designate identical or corresponding parts throughout the several views, a head for an electronic thermometer in accordance with the present invention is illustrated and includes a rod or bar 1 which is substantially thin and long. The rod has one end portion which is connected to a schematically illustrated electronic measuring device by conventional means such as electronic conductors. The electric conductors as well as the electronic measuring device are known per se in the art.

The other of the end portions of the rod 1 tapers to prism 2 and terminates at a substantially thin end section 3 formed with a blade-like configuration having any suitable cross section. Advantageously, the end section 3 has two opposed sides which are defined by substantially flat or planar faces. The blade-shaped end section 3 forms a part of the head, which during the temperature-monitoring operation, is in contact with the user's body as will be described hereinbelow.

The end section 3 of the rod 1 is formed of any suitable thermal insulating material and as seen in FIG. 1 is self supporting and carries a temperature sensor member 4 located inside of an opening 5 formed therein. The opening 5 may have any arbitrary shape, three possible embodiments thereof being illustrated in FIGS. 2, 3 and 4 respectively. As can be seen from the drawing, the opening may also extend to the outer edge of the end section 3 of the rod 1, in which case the sensor member 4 is placed at a tip of the rod 1.

The sensor member 4 is surrounded by a heat-conductive element 6 which may have a round or circular, i.e., disc-shaped configuration. The sensor member 4 may be either partially or completely embedded in the heat-conductive element 6. The heat-conductive element 6 is exposed either at one or at both sides of the end section 3 of the rod 1. The heat-conductive element 6 may be flush with or extend laterally to a slight extent beyond one or both of the flat sides of the rod end section 3.

The heat-conductive element 6 may be formed of any suitable conventional material such, for example, as an alloy of mercury fused with metal. In addition to being both a good electrical conductor and mechanically and chemically resistant, such an alloy has a relatively low cost and is compatible with the biological media whose temperature is monitored. Additionally such construction affords easy handling during use.

In order to further facilitate the heat exchange, it is possible to apply a layer 7 of a heat conductive material on one or both sides of the end section 3 of the rod 1. Such layers may be formed as thin metal blades of silver or copper or as produced by colloidal and/or electrolytic plating.

Since the end section 3 of the rod 1 has a reduced thickness, and the thermal contact may be provided at one or both faces of this section, the time constant for the device is relatively short, i.e., an accurate, steady-state temperature reading can be obtained in a length of time which is considerably shorter than that required by conventional thermometers.

During clinical use, the head of the present invention may be covered by a thin disposable plastic hood. In such case, the heat is transmitted through the plastic hood to the heat-conductive element 6 and then to the sensor member 4. Even when the above-mentioned plastic hood is utilized, the time constant of an electronic thermometer equipped with a head according to the present invention is considerably lower than that required by conventional thermometers.

Obviously, numerous modifications and variations of the present invention are possible in the light of the above teachings. Accordingly it is understood that within the scope of the appended claims, the invention may be practiced otherwise then as specifically disclosed herein.

What is claimed is:

1. A head for use with an electronic thermometer, comprising: a substantially thin elongate rod having conductor means extending therethrough which are electrically connectable with an electronic temperature indicating circuit, said rod having a substantially thin, self-supporting end portion extending therefrom, said thin end portion being formed of thermal insulating material and defined by a pair of opposed exteriorly facing side surfaces;

an element formed of thermal conductive material arranged in said end portion of said rod, said element having a surface portion which is exteriorly exposed at least at one of the said side surfaces of said end portion wherein an opening is formed in said end portion which opens at least at one of said side surfaces thereof; and a temperature sensor member at least partially embedded in said thermally-conductive element in the opening of said end portion and electrically coupled to said conductor means.

2. A head for use with an electronic thermometer as defined in claim 1 wherein said opposed exteriorly facing side surfaces extend substantially parallel to each other and in planes which are substantially parallel to the longitudinal axis of said rod.

3. A head for use with an electronic thermometer as defined in claim 2 wherein said opening formed in said end portion extends through its entire thickness so as to open at both of said side surfaces thereof, said thermally-conductive element being located in said opening so that respective side portions thereof are exteriorly exposed at both of said side surfaces of said rod end portion.

4. A head for use with an electronic thermometer as defined in claim 1, wherein said temperature sensor member is substantially completely embedded in said thermally-conductive element.

5. A head for use with an electronic thermometer as defined in claim 1, wherein respective side portions of said thermally-conductive element are exteriorly exposed at respective ones of both of said side surfaces of said end portion of said rod.

6. A head for use with an electronic thermometer as defined in claim 1, wherein said side portion of said thermally-conductive element extends outwardly beyond at least one of said side surfaces of said end portion of said rod.

7. A head for use with a electronic thermometer as defined in claim 1, wherein said thermally conductive element is substantially disc-shaped, said temperature sensor being located substantially centrally of and outwardly surrounded by said thermally-conductive element.

8. A head for use with an electronic thermometer as defined in claim 1, wherein said thermally-conductive element is an element produced by metal fusion.

9. A head for use with an electronic thermometer as defined in claim 1, wherein at least a portion of the surfaces defining said end portion of said rod is coated by a heat-conductive material.

10. A head for use with an electronic thermometer as defined in claim 1, wherein at least a portion of the surfaces defining said end portion of said rod is covered with a metal plate of substantially small thickness.

* * * * *

UNITED STATES PATENT AND TRADEMARK OFFICE
CERTIFICATE OF CORRECTION

PATENT NO. : 4,250,751
DATED : February 17, 1981
INVENTOR(S) : Albert Holzhacher It is certified that error appears in the above—identified patent and that said Letters Patent is hereby corrected as shown below:

[30] FOREIGN APPLICATION PRIORITY DATA should read:

July 13, 1978 Brazil.... 7804514

Signed and Sealed this

Twelfth Day of January 1982

[SEAL]

Attest:

GERALD J. MOSSINGHOFF

Attesting Officer — Commissioner of Patents and Trademarks